May 12, 1936.  W. A. HEINZE  2,040,379
GREASE RETAINER WITH CHANNELED SPACER
Filed June 21, 1934

WILLIAM A. HEINZE
INVENTOR
PER  Albert J. Fihe
ATTORNEY

Patented May 12, 1936

2,040,379

UNITED STATES PATENT OFFICE 2,040,379

GREASE RETAINER WITH CHANNELED SPACER

William A. Heinze, Chicago, Ill., assignor to Victor Manufacturing & Gasket Company, Chicago, Ill., a corporation of Illinois Application June 21, 1934, Serial No. 731,696

3 Claims. (Cl. 288—1)

This invention relates to an improved grease retainer with a channeled spacer, and has for one of its principal objects, the provision of means for retaining grease or sealing oil in bearings or the like and around rotatable shafts, especially in automobiles and similar devices.

One of the important objects of this invention is to provide in a grease retainer or oil seal, a flexible packing element, preferably composed of leather and formed in a cup or hat shape, which leather packing is mounted in an assembly for convenient installation in the housing and about the shaft of an automobile or the like.

Another important object of the invention resides in the provision of a combination of a flexible leather packing, having a portion bent or offset to encircle a shaft, and with means such as a garter spring to more closely force the leather against the shaft in oil retaining relation, the whole being mounted in a housing which, in addition to clamping the leather securely in desired position, also furnishes a structure suitable for a drive or pressed fit into a housing in oil-tight relationship therewith.

Another and still further important object of the invention is to provide a grease retainer of the type above described which shall be so constructed and reinforced that extraneous force or other means applied to position the same in desired relationship with the housing and shaft will not distort or loosen the assembly of leather and housing so that a tight-fit and efficient seal will always result.

Other and further important objects of the invention will be apparent from the disclosures in the accompanying drawing and following specification.

The invention, in a preferred form, is illustrated in the drawing and hereinafter more fully described.

Figure 1:
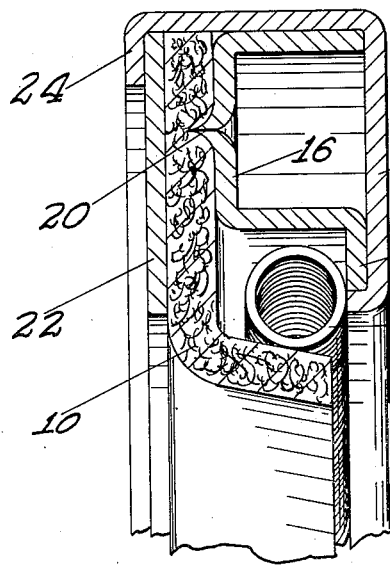
Figure 1 is a sectional view of a portion of the improved grease retainer with channeled spacer of this invention.

The reference numeral 10 in Figure 1 illustrates the packing of the improved grease retainer of this invention, this packing preferably comprising a disk of leather or similar flexible material having an opening in the middle thereof for the reception of a rotatable element such as a shaft, and with that portion of the leather adjacent the opening bent outwardly somewhat into L-shape as shown to form a better contact with the corresponding surface of the rotatable shaft.

A garter spring 12 is provided, contacting the leather adjacent its offset portion for the purpose of providing a better surface contact between the inner face of the leather and the adjacent surface of the shaft.

In order to hold the leather in position about the shaft and securely mount the same in the housing through which the shaft passes, a retainer is provided which comprises essentially a housing or outer shell 14 cup-shaped as shown and with a central opening for the passage of the shaft therethrough.

Positioned on the bottom of this housing or outer shell 14 is a spacer member or the like 16 which comprises essentially an annular channel-shaped element, one arm of the channel having an inwardly bent flange 18 as shown for a better gripping and positioning relationship with corresponding portions of the outer shell or housing 14. It will be noted that that portion of the shell 14 adjacent the central opening is bent inwardly so as to contact the inner periphery of the element 18 of the spacer and securely mount the same in desired position. These juxtaposed parts also act against the spring 12, thereby positioning the same in desired relationship in the housing and with regard to the leather packing.

One face of the leather packing is positioned against the corresponding faces of the channel element 16—18, and this channel element or spacer preferably has struck outwardly therefrom a series of tangs or projections 20 which penetrate the material of the leather so as to insure a firmer grip and also to prevent any undesirable turning of the leather in the housing which might otherwise occur owing to the rotation of the shaft about which the leather is positioned.

In order to maintain the packing in desired relationship in the shell or housing, a retaining washer 22 is preferable, this being of an outside diameter equal to the inside diameter of the shell 14 and positioned therein over the leather in such a manner as to clamp the leather between its inner face and the corresponding outer face of the channeled element 16.

After this assembly has been completed, a flange 24 of the shell 14 is spun down over the outer edge of the washer 22 so as to produce a unitary structure which can then be readily inserted in position in a housing and about a shaft by drive or pressed fit, and on account of its reinforced structure, will withstand all ordinary stresses and strains due to this driving or pressing action, while, at the same time, the leather is always securely mounted in the housing for proper and efficient oil sealing relationship with a shaft passing therethrough.

Figure 2:
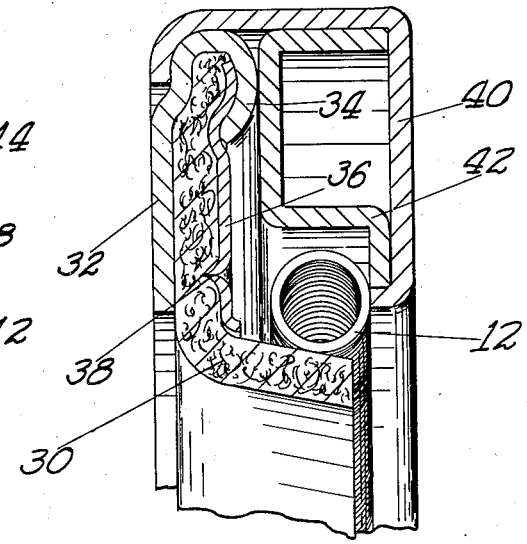
Figure 2 illustrates a slight modification of the invention wherein the leather is preliminarily incased in an armor or sheathe.

A slight modification of the invention is illustrated in Figure 2 wherein the leather packing element 30 is preliminarily incased in an armored or metal sheath 32 which covers the outer face of the leather, and has its inner end 34 bent inwardly and thence downwardly into clinching relationship with a secondary armor or shell portion 36 positioned against the inner face of the leather and which element 36 is preferably composed of metal of substantially less thickness than the metal comprising the element 32. The armored portion 36 likewise has inwardly struck tangs or the like 38 so as to more securely grip the leather in desired position, and it will be noted that the member 34 extends inwardly and fits against the leather over substantially its entire flat surface and has its inner periphery terminating along substantially the line of bend of the leather 30 whereby a better sealing action against a rotating shaft results.

A housing 40 similar to the housing 14 and a spacer 42 similar to the spacer 16—18 are provided to complete the assembly together with the garter spring 12.

Figure 3:
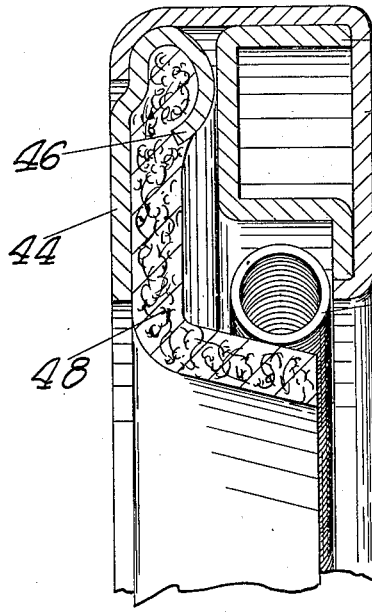
Figure 3 shows a further modification of the device shown in Figure 2, a portion of the metal armor for the leather being omitted.
Figure 4:
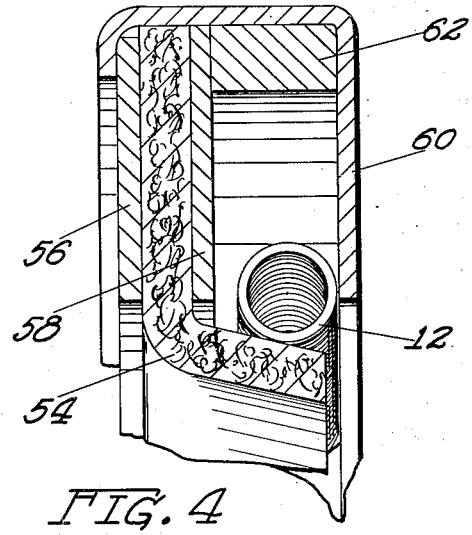
Figure 4 illustrates a still further modification wherein two elements are substituted for the channeled spacer of the other structures.

A combination of the various parts may be used, as, for example, the spacer ring shown at 62 in Figure 4 may be eliminated, and the channel shown at 52 in Figure 3 substituted therefor.

In Figure 3 is shown a further modification of the invention of Figure 2 wherein the inner armored plate is omitted, the outer armored plate 44 being bent inwardly as at 46 to actually clinch and grip the leather 48 in non-slipping and non-rotatable relationship therewith. This assembly is then mounted in a housing 50 together with a channel-shaped spacer 52 and the usual garter spring 12.

In Figure 4, another modification is illustrated, and in this instance, the leather packing 54 is held in position by means of a pair of washers 56 and 58 as shown, one contacting each face of the leather and held in position in an outer shell or casing 60 by means of an annular spacer or ring 62. The usual garter spring 12 is also provided.

The above construction provides a simple yet very efficient grease retainer which is economical of manufacture and which, on account of its ruggedness, meets all the requirements of the trade while, at the same time, complying with the requirements of competitive manufacturing, particularly so far as economy of production is concerned.

I am aware that many changes may be made and numerous details of construction varied through a wide range without departing from the principles of this invention, and I, therefore, do not purpose limiting the patent granted hereon otherwise than as necessitated by the prior art.

I claim as my invention:

1. A grease retainer, comprising a flexible packing element and a housing for the same, said housing including an outer cup-shaped annular shell, an armor for the packing, said armor forming another wall of the housing and comprising a relatively heavy metal washer with one edge in-turned to grip the packing element, and a relatively thin metal washer against the inner face of the packing with its outer edge under the in-turned edge of the heavier washer and with its inner edge acting against a bend in the packing and means in the shell for positioning the packing element and spacing the same away from the bottom of the shell, said means including a channeled spacer, and additional means acting against the packing for maintaining the same in desired surface relationship with the rotating shaft, said means comprising a garter spring, the packing being L-shaped in cross-section to form an inner flange, and the garter spring acting against the said inner flange of the packing.

2. A grease retainer, comprising a flexible packing element and a housing for the same, said housing including an outer cup-shaped annular shell, and means in the shell for positioning the packing element and spacing the same away from the bottom of the shell, said means including a channeled spacer, and additional means acting against the packing for maintaining the same in desired surface relationship with the rotating shaft, said means comprising a garter spring, the packing being L-shaped in cross-section to form an inner flange, and the garter spring acting against the said inner flange of the packing, the channeled spacer providing a compartment between itself and the packing for housing the said garter spring, and an in-turned lip at the inner periphery of the outer shell for positioning the channeled spacer and for acting against and also positioning the garter spring.

3. A grease retainer, comprising a flexible annular packing element L-shaped in cross section and a housing for the same, said housing including an outer cup-shaped annular shell, having a rim and at least one side wall and means in the shell for positioning the packing element and spacing the same away from the bottom of the shell, said means including an armor for the packing the armor including a facing element forming one wall of the housing when assembled therein and an inner element, both of said elements inclosing one of the arms of the packing and with the inner element acting against the bend in the packing, and an annular spacer in the shell acting against the armor for positioning the packing.

WILLIAM A. HEINZE.